United States Patent
Wilson et al.

(10) Patent No.: US 9,732,619 B2
(45) Date of Patent: Aug. 15, 2017

(54) RETAINING RINGS FOR TURBOMACHINE DISK AND COVERPLATE ASSEMBLIES

(71) Applicant: UNITED TECHNOLOGIES CORPORATION, Farmington, CT (US)

(72) Inventors: Ross Wilson, South Glastonbury, CT (US); Dwayne K. Mecklenburg, Stafford Springs, CT (US); Zachary Mott, Glastonbury, CT (US); David R. Griffin, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 317 days.

(21) Appl. No.: 14/674,084

(22) Filed: Mar. 31, 2015

(65) Prior Publication Data
US 2016/0290141 A1     Oct. 6, 2016

(51) Int. Cl.
*F01D 5/30* (2006.01)
*F01D 5/08* (2006.01)
*F01D 25/12* (2006.01)

(52) U.S. Cl.
CPC .......... *F01D 5/3007* (2013.01); *F01D 5/081* (2013.01); *F01D 5/082* (2013.01); *F01D 5/3015* (2013.01); *F01D 25/12* (2013.01); *Y02T 50/676* (2013.01)

(58) Field of Classification Search
CPC ...... F01D 5/3007; F01D 5/3015; F01D 5/081; F01D 5/082; F01D 5/087
USPC ..................................... 416/220 R
See application file for complete search history.

(56) References Cited

U.S. PATENT DOCUMENTS

| 4,803,893 A | 2/1989 | Bachinski |
| 5,622,475 A * | 4/1997 | Hayner ................. F01D 5/3015 416/219 R |

FOREIGN PATENT DOCUMENTS

| EP | 2011966 A2 | 1/2009 |
| WO | 2011092439 A1 | 8/2011 |

OTHER PUBLICATIONS

European Search Report for Application No. EP 16153493.

* cited by examiner

*Primary Examiner* — Dwayne J White
*Assistant Examiner* — Peter T Hrubiec
(74) *Attorney, Agent, or Firm* — Cantor Colburn LLP

(57) ABSTRACT

A retaining ring for a turbomachine disk and coverplate assembly includes a ring body defining a coverplate interface side and an opposed disk lip interface side. A flow feature is defined by the ring body on the coverplate interface side to allow airflow between the turbomachine disk coverplate and the ring body such that a pocket defined between the coverplate and the turbomachine disk is in fluid communication with a conditioning flow pathway through the retaining ring.

20 Claims, 4 Drawing Sheets

RETAINING RINGS FOR TURBOMACHINE DISK AND COVERPLATE ASSEMBLIES

STATEMENT OF GOVERNMENT RIGHTS

This invention was made with government support under contract no. FA 8650-09-D-2923-0021 awarded by the Air Force. The government has certain rights in the invention.

BACKGROUND

1. Field

The present disclosure relates to turbomachine disk and coverplate assemblies, more specifically to retaining rings for retaining a coverplate against a disk.

2. Description of Related Art

Traditional retaining rings include a substantially annular ring including a small split. The retaining rings are shaped and sized to retain an inner diameter portion of a coverplate to a lip that extends off of a turbomachine disk. By virtue of this interface, a substantially isolated pocket is created between the coverplate and the disk. This can lead to sections of the disk being less cooled than other portions since conditioning flow cannot enter into the sealed pockets.

Such conventional methods and systems have generally been considered satisfactory for their intended purpose. However, there is still a need in the art for improved retaining rings. The present disclosure provides a solution for this need.

SUMMARY

A retaining ring for a turbomachine disk and coverplate assembly includes a ring body defining a coverplate interface side and an opposed disk lip interface side. A flow feature is defined by the ring body on the coverplate interface side to allow airflow between the turbomachine disk coverplate and the ring body such that a pocket defined between the coverplate and the turbomachine disk is in fluid communication with a conditioning flow pathway through the retaining ring.

The ring body can include a segment such that the ring body is a split ring. In certain embodiments, the ring body can be a full hoop.

In certain embodiments, the flow feature is a milled feature. In certain embodiments, the ring body can be additively manufactured or cast to include the flow feature.

The flow feature can be defined to have an at least partially curved profile. For example, the flow feature can define a partially cylindrical cut-out in the ring body.

The retaining ring can further include a plurality of circumferentially spaced apart flow features defined by the ring body. Any suitable number of flow features is contemplated herein.

In certain embodiments, the flow feature or a plurality thereof as describe above can be defined by the ring body on the disk lip interface side to allow airflow between a disk lip and the ring body such that a pocket defined between the coverplate and the turbomachine disk is in fluid communication with a conditioning flow pathway through the retaining ring.

A method for manufacturing a retaining ring can include forming a ring body to include a coverplate interface side and a disk lip interface side and defining a flow feature in the ring body on at least one of the coverplate interface side or the disk lip side such that a pocket defined between the coverplate and the turbomachine disk is in fluid communication with a conditioning flow pathway through the retaining ring.

Defining the flow feature in the ring body can be done during forming the ring body. In certain embodiments, defining the flow feature can include milling the flow feature into the ring body. Defining the flow feature can include defining a plurality of circumferentially spaced apart flow features in the ring body.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
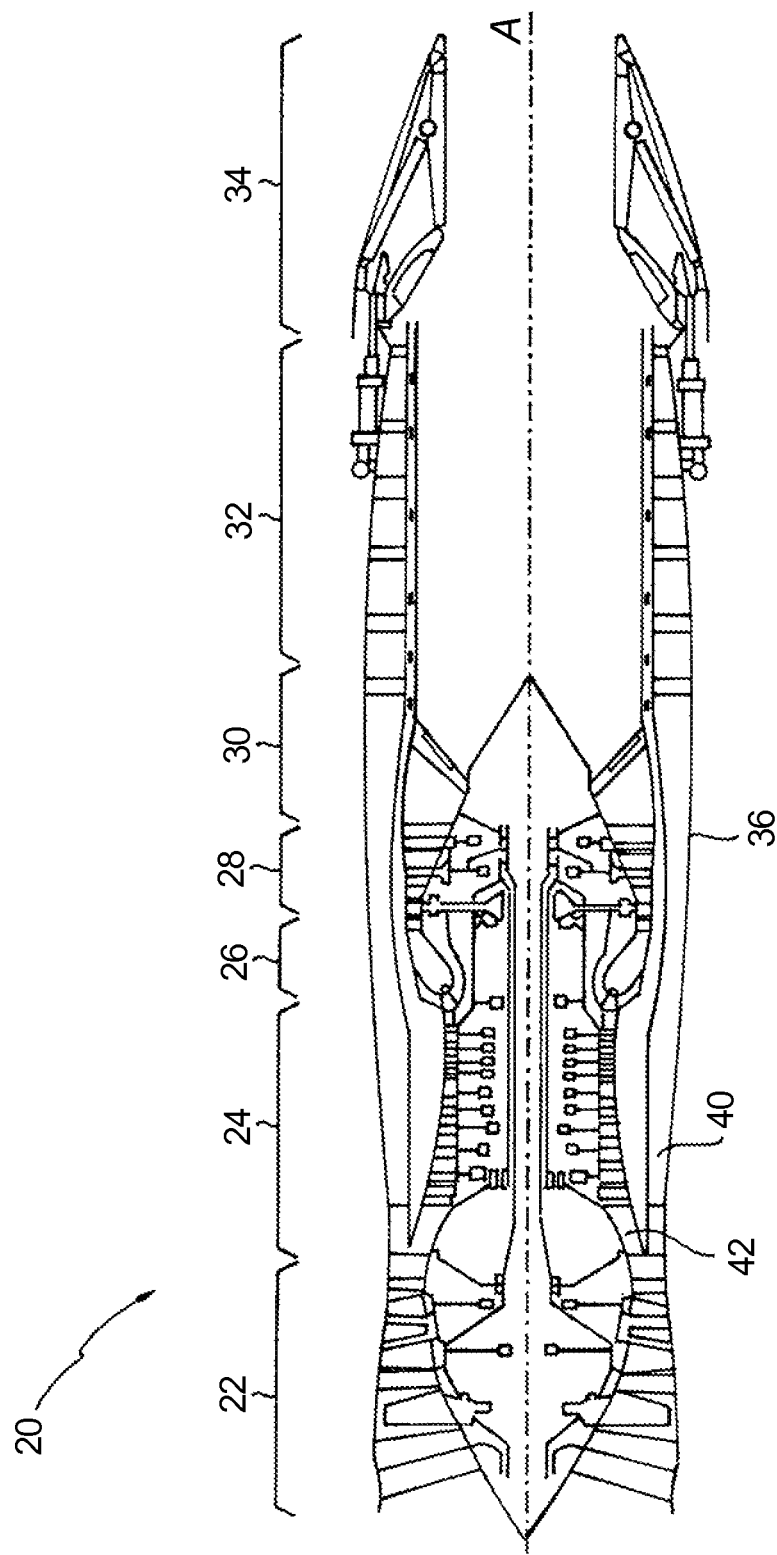
FIG. 1 is a schematic view of a turbomachine in accordance with this disclosure.
Figure 2A:
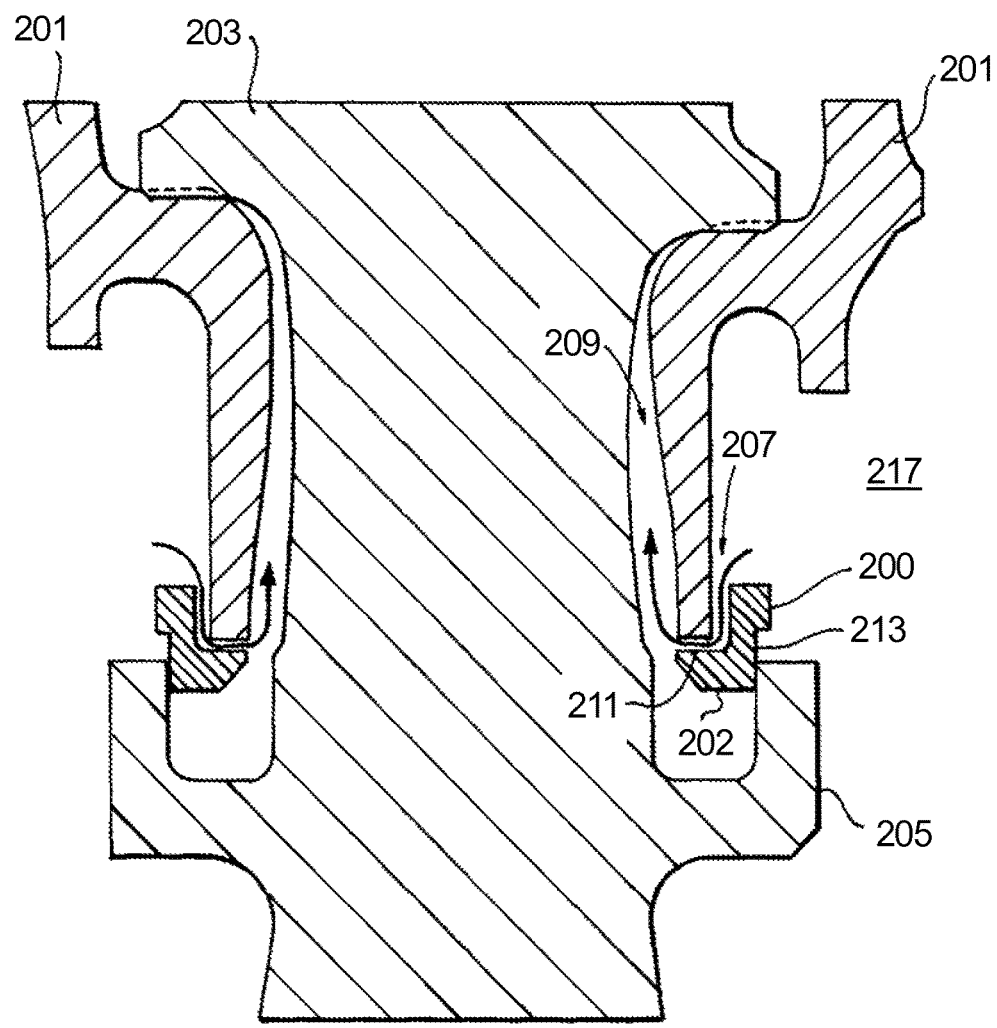
FIG. 2A is a schematic view of an embodiment of a disk and coverplate assembly in accordance with this disclosure, shown including an embodiment of a retaining ring having a flow feature therein.
Figure 2B:
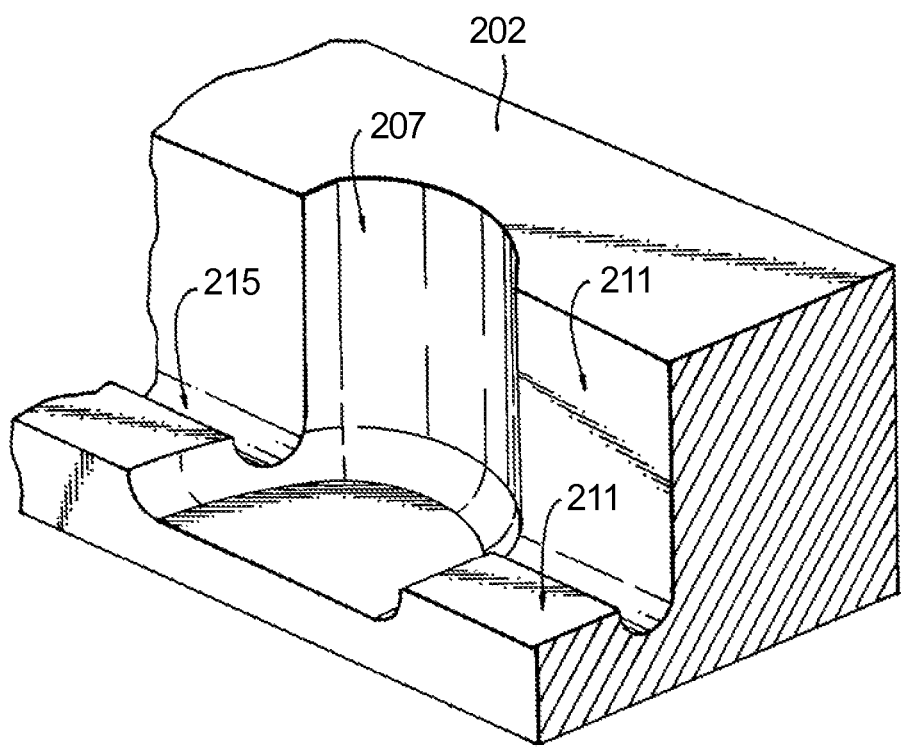
FIG. 2B is a partial perspective view of the retaining ring shown in FIG. 2A, showing a flow feature defined in the retaining ring.
Figure 3:
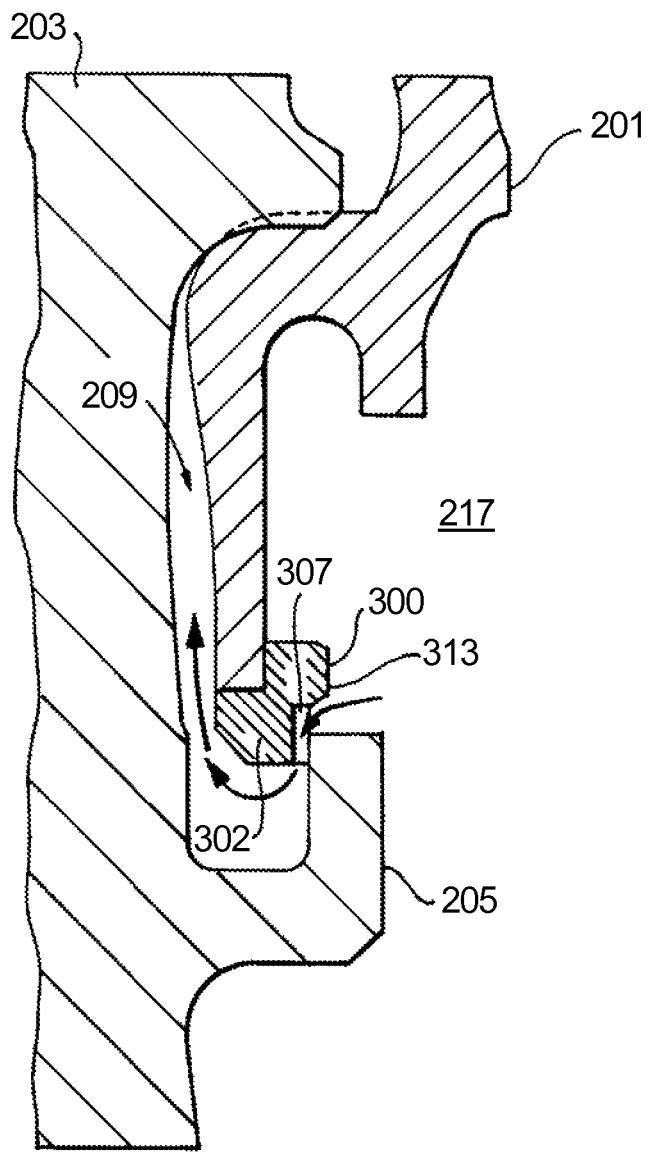
FIG. 3 is a schematic view of another embodiment of a disk and coverplate assembly in accordance with this disclosure, shown including another embodiment of a retaining ring having a flow feature therein.

Reference will now be made to the drawings wherein like reference numerals identify similar structural features or aspects of the subject disclosure. For purposes of explanation and illustration, and not limitation, an illustrative view of an embodiment of a retaining ring in accordance with the disclosure is shown in FIGS. 2A and 2B and is designated generally by reference character 200. Other embodiments and/or aspects of this disclosure are shown in FIGS. 1 and 3. The systems and methods described herein can be used to improve thermal regulation of turbomachine disks and coverplates, for example.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

An engine case structure 36 defines a generally annular secondary airflow path 40 around a core airflow path 42. It should be appreciated that various components, individually and collectively, may define the engine case structure 36 that essentially defines an exoskeleton to support the rotational hardware.

Air that enters the fan section 22 is divided between a core airflow through the core airflow path 42 and a secondary airflow through a secondary airflow path 40. The core airflow passes through the combustor section 26, the turbine section 28, then the augmentor section 30 where fuel may be selectively injected and burned to generate additional thrust through the nozzle system 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein may be any airflow different from the core airflow. The secondary airflow may ultimately be at least partially injected into the core airflow path 42 adjacent to the exhaust duct section 32 and the nozzle system 34.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 may terminate in a Convergent/Divergent (C/D) nozzle system, a non-axisymmetric two-dimensional (2D) C/D vectorable nozzle system, a flattened slot nozzle of high aspect ratio or other nozzle arrangement.

Referring to FIGS. 2A and 2B, a retaining ring 200 for a turbomachine disk 203 and coverplate 201 assembly includes a ring body 202 defining a coverplate interface side 211 and a disk lip interface side 213. As shown in FIG. 2B, one or more flow features 207 can be defined by the ring body 202 on the coverplate interface side 211 to allow airflow between the turbomachine disk coverplate 201 and the ring body 202 such that a pocket 209 defined between the coverplate 201 and the turbomachine disk 203 is in fluid communication with a conditioning flow pathway 217 when the ring 200 is installed on the disk 203 and coverplate 201 through the ring 200. Any suitable number of flow features 207 are contemplated herein.

The ring body 202 can include a segment such that the ring body 202 is a split ring. In certain embodiments, the ring body 202 can be a full hoop. As shown, the ring body 202 can define an L shaped coverplate interface side 211 for retaining one or more coverplates 201. The ring body 202 can also include an L shaped disk lip interface side 213 for mounting against a disk lip 205. Any other suitable shape for sides 211, 213 is contemplated herein.

The ring body 202 can further define a circumferential channel 215 therein which is in fluid communication with one or more of the flow features 207. This can allow foe circumferentially conditioning flow around the retaining ring 200.

In certain embodiments, the flow features 207 are a milled feature. In certain embodiments, the ring body 202 can be additively manufactured or cast to include the flow features 207. Any other suitable process for manufacturing the retaining ring 200 with one or more flow features 207 is contemplated herein.

One or more flow features 207 can be defined to have an at least partially curved profile. For example, as shown in FIG. 2B, the flow features 207 can define a partially cylindrical cut-out in the ring body 202. The flow features 207 can be defined in both faces of the L shape of the coverplate interface side 211 in order to allow airflow to travel along the side and underneath the coverplate 201 as shown in FIG. 1A. Any other suitable shapes, sizes, and/or locations of the flow features 207 are contemplated herein.

Referring to FIG. 3, in certain embodiments, one or more flow features 307 of a retaining ring 300 thereof can be defined by the ring body 302 on the disk lip interface side 313 to allow airflow between a disk lip 205 and the ring body 302 such that a pocket 209 defined between the coverplate 201 and the turbomachine disk 203 is in fluid communication with a conditioning flow pathway 217 when the ring 200 is installed on the disk 203 and coverplate 201 through the ring 200. The flow features 307 of retaining ring 300 can otherwise include similar features (e.g., shapes, sizes, locations) as the flow features 207 described above.

A method for manufacturing a retaining ring 200 can include forming a ring body 202 to include a coverplate interface side 211 and a disk lip interface side 213 and defining a flow feature 207 in the ring body 202 on at least one of the coverplate interface side 211 or the disk lip side 213 such that a pocket 209 defined between the coverplate 201 and the turbomachine disk 203 is in fluid communication with a conditioning flow pathway 217 when the ring 200 is installed on the disk 203 and coverplate 201.

Defining the flow feature 207 in the ring body 202 can be done during forming the ring body 202. In certain embodiments, defining the flow feature 207 can include milling the flow feature 207 into the ring body 202. Defining the flow feature 202 can include defining a plurality of flow features 207 in the ring body 202.

Flow features 207, 307 as described above create features to provide thermal relief for, e.g., thermal lag experienced in the dusk 203 during operation of the turbomachine. Further, a circumferential layout of a plurality of flow features 207 can allow for an even flow distribution the entire disk 203. Reduced thermal lag decreases structural impact and support improved disk stress values.

The methods and systems of the present disclosure, as described above and shown in the drawings, provide for retaining rings with superior properties including improved thermal management. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A retaining ring for a turbomachine disk and coverplate assembly, comprising:
   a ring body defining a coverplate interface side and an opposed disk lip interface side; and
   a flow feature defined by the ring body on the coverplate interface side to allow airflow between the turbomachine disk coverplate and the ring body such that a pocket defined between the coverplate and the turbomachine disk is in fluid communication with a conditioning flow pathway through the retaining ring.

2. The retaining ring of claim 1, wherein the ring body includes a segment such that the ring body is a split ring.

3. The retaining ring of claim 1, wherein the ring body is a full hoop.

4. The retaining ring of claim 1, wherein the flow feature is a milled feature.

5. The retaining ring of claim 1, wherein the ring body is additively manufactured or cast to include the flow feature.

6. The retaining ring of claim 1, wherein the flow feature is defined to have an at least partially curved profile.

7. The retaining ring of claim 6, wherein the flow feature defines a partially cylindrical cut-out in the ring body.

8. The retaining ring of claim 1, further comprising a plurality of circumferentially spaced apart flow features defined by the ring body.

9. A retaining ring for a turbomachine disk and coverplate assembly, comprising:
   a ring body defining a coverplate interface side and an opposed disk lip interface side; and
   a flow feature defined by the ring body on the disk lip interface side to allow airflow between a disk lip and the ring body such that a pocket defined between the coverplate and the turbomachine disk is in fluid communication with a conditioning flow pathway through the retaining ring.

10. The retaining ring of claim 9, wherein the ring body includes a segment such that the ring body is a split ring.

11. The retaining ring of claim 9, wherein the ring body is a full hoop.

12. The retaining ring of claim 9, wherein the flow feature is a milled feature.

13. The retaining ring of claim 9, wherein the ring body is additively manufactured or cast to include the flow feature.

14. The retaining ring of claim 9, wherein the flow feature is defined to have an at least partially curved profile.

15. The retaining ring of claim 14, wherein the flow feature defines a partially cylindrical cut-out in the ring body.

16. The retaining ring of claim 9, further comprising a plurality of circumferentially spaced apart flow features defined by the ring body.

17. A method for manufacturing a retaining ring, comprising:
   forming a ring body to include a coverplate interface side and a disk lip interface side; and
   defining a flow feature in the ring body on at least one of the coverplate interface side or the disk lip side such that a pocket defined between the coverplate and the turbomachine disk is in fluid communication with a conditioning flow pathway through the retaining ring.

18. The method of claim 17, wherein defining the flow feature in the ring body is done during forming the ring body.

19. The method of claim 17, wherein defining the flow feature includes milling the flow feature into the ring body.

20. The method of claim 17, wherein defining the flow feature further includes defining a plurality of flow features in the ring body.

* * * * *